United States Patent [19]
Mizutani

[11] Patent Number: 6,078,400
[45] Date of Patent: Jun. 20, 2000

[54] PRINTING SYSTEM HAVING FUNCTION OF DISPLAYING ERROR INFORMATION AND METHOD OF DISPLAYING ERROR INFORMATION

[75] Inventor: Norio Mizutani, Nagoya, Japan

[73] Assignee: Brother Kogyo Kabushiki Kaisha, Nagoya, Japan

[21] Appl. No.: 09/064,771

[22] Filed: Apr. 23, 1998

[30]  Foreign Application Priority Data

Apr. 28, 1997  [JP]  Japan .................................. 9-111452

[51] Int. Cl.[7] .................................................. G06F 15/00
[52] U.S. Cl. ............................................. 358/1.14; 399/18
[58] Field of Search ............................... 358/1.1, 1.4, 1.9, 358/1.12, 1.13, 1.14, 1.15, 1.18, 401, 437, 439, 442, 448; 399/8, 9, 10, 11, 18, 19, 81; 355/77, 133; 400/74; 364/183, 737; 371/2.1, 21.6, 47.1, 48; 382/309

[56]  References Cited

U.S. PATENT DOCUMENTS

| | | | |
|---|---|---|---|
| 4,745,602 | 5/1988 | Morrell ........................................ | 714/2 |
| 5,027,154 | 6/1991 | Ujiie et al. ................................. | 355/77 |
| 5,537,626 | 7/1996 | Kraslavsky et al. ....................... | 710/8 |
| 5,620,264 | 4/1997 | Kagita ....................................... | 400/74 |
| 5,699,494 | 12/1997 | Colbert et al. ........................... | 358/1.15 |
| 5,727,135 | 3/1998 | Webb et al. .............................. | 358/1.14 |
| 5,734,804 | 3/1998 | Bergner .................................... | 358/1.14 |
| 5,799,206 | 8/1998 | Kitagawa et al. ........................ | 710/36 |

FOREIGN PATENT DOCUMENTS

0575168A1  12/1993  European Pat. Off. .
A-6-110626  4/1994  Japan .

Primary Examiner—Dov Popovici
Assistant Examiner—Gabriel I. Garcia
Attorney, Agent, or Firm—Oliff & Berridge, PLC

[57]  ABSTRACT

A printing system has a host apparatus for generating print data and sending the generated print data to a printing apparatus, and the printing apparatus for printing an image on the basis of the received print data. The host apparatus has: a print data generating device for generating the print data; a print data sending device for sending the generated print data to the printing apparatus; an error information receiving device for receiving image data as error information from the printing apparatus; and an error information displaying device for displaying an image on the basis of the received image data, and the printing apparatus has: a print data receiving device for receiving the print data from the host apparatus; a print data storing device for storing the received print data; an image data generating device for generating the image data on the basis of the stored print data; a printing device for printing an image on the basis of the generated image data; an error detecting device for detecting an error in a process from receiving the print data by the print data receiving device to printing the image by the printing device; and an error information sending device for sending the stored image data at a stage where the error is detected by the error detecting device, as the error information, to the host apparatus.

21 Claims, 5 Drawing Sheets

PRINTING SYSTEM HAVING FUNCTION OF DISPLAYING ERROR INFORMATION AND METHOD OF DISPLAYING ERROR INFORMATION

BACKGROUND OF THE INVENTION

1. Field of the Invention

The present invention relates to a printing system having a host apparatus and a printing apparatus, wherein error information of the printing apparatus is displayed by the host apparatus, and a method of displaying error information of a printing apparatus by a host apparatus.

2. Description of the Related Art

In a printing system having a host apparatus, such as a computer, and a printing apparatus, in order to print an image produced by the host apparatus, the host apparatus generates print data corresponding to the image by using a page description language, and sends it to the printing apparatus.

Further, the printing apparatus receives the print data, analyzes the print data by using an emulation program or an interpreter program, and converts (expands) the print data into bitmap data in a page memory. Then, the printing apparatus outputs the bitmap data to a print engine to print the image.

However, if it happens to be short of memory space while an expanding process (converting process) is carried out in the printing apparatus, the image may not be normally printed. If there is an error or mistake included in the print data sent from the host apparatus, the expanding process may not be normally carried out. Furthermore, if there is an error or a bug included in the emulation program itself, the expanding process may not be normally carried out too.

In order to cope with the shortage of memory space, the memory device may be added in the printing apparatus. In case that the addition of the hardware is impossible, the quantity of the print data needs to be reduced.

In order to cope with the error included in the print data, the print data needs to be reconsidered and changed.

Furthermore, in order to cope with the error included in the emulation program, the print data needs to be changed so as to not hit the error part of the emulation program.

Here, when such an error actually happens in the printing system, an error message is displayed on a display panel of a manipulating portion installed in the printing apparatus. Further, the error message is sent to the host apparatus, and displayed by the host apparatus.

However, in such a way, a user of the printing system cannot easily understand the state of the error. Namely, a user cannot easily judge whether the cause of the error is the shortage of the memory space, mistake of the print data, a bug of the emulation program, or the like.

On the other hand, the method that an image is print out when the error happens is proposed. When the error happens, if a user can see the printed image, the user judged the state of the error on the basis of the condition of the printed image.

However, in this method, a user feels inconvenience in case that the printing apparatus is put at a place far from the host computer. Because the user has to move from the place of the host apparatus to the place of the printing in order to see the image printed out by the printing apparatus, for each time the error happens.

Moreover, in this method, when the error happens at the stage of the printing process, an image is not printed, so that a user cannot obtain the image. Therefore, the user cannot understand whether or not the error happens and cannot understand the state of error.

SUMMARY OF THE INVENTION

It is therefore an object of the present invention to provide a printing system and a method wherein when an error happens in a printing apparatus, not only occurrence of the error but also a state of the error can be accurately and easily confirmed at the side of a host apparatus.

According to the present invention, the aforementioned object can be achieved by a printing system having a host apparatus for generating print data and sending the generated print data to a printing apparatus, and the printing apparatus for printing an image on the basis of the received print data, the host apparatus having: a print data generating device for generating the print data; a print data sending device for sending the generated print data to the printing apparatus; an error information receiving device for receiving image data from the printing apparatus; and an error information displaying device for displaying an image on the basis of the received image data as error information, the printing apparatus having: a print data receiving device for receiving the print data from the host apparatus; a print data storing device for storing the received print data; an image data generating device for generating the image data on the basis of the stored print data; a printing device for printing an image on the basis of the generated image data; an error detecting device for detecting an error in processes from receiving the print data by the print data receiving device to printing the image by the printing device; and an error information sending device for sending the generated image data at a stage where the error is detected by the error detecting device to the host apparatus.

Namely, at first, in the host apparatus, the print data generating device generates the print data. The print data is data to be printed by the printing apparatus. Next, the print data sending device sends the generated print data to the printing apparatus. Next, in the printing apparatus, the print data receiving device receives the print data from the host apparatus. Next, the print data storing device stores the received print data in the printing apparatus. Next, in the printing apparatus, the image data generating device generates the image data on the basis of the stored print data. Next, the printing device prints the generated image data on a recording material. In the printing apparatus, the error detecting device detects an error in the processes from receiving the print data by the print data receiving device to printing the image by the printing device. When the error is detected, the error information sending device sends the generated image data at a stage where the error is detected by the error detecting device to the host apparatus. On the other hand, in host apparatus, the error information receiving device receives the image data from the printing apparatus. Next, the error information displaying device displays the image on the basis of the received image data as the error information.

Thus, a user can recognize the state of the error by seeing the displayed image made form the image data at the stage when the error is detected. Accordingly, the user can easily and quickly know the cause of the error and try to find the best measures to cope with the error.

Furthermore, as the error information, i.e. the image based on the image data is displayed by the host apparatus, a user can quickly see the image and know the state of the error. A user need not to move between the place of the host apparatus and the place of the printing apparatus even if the printing apparatus is put at the place far from the host apparatus.

Moreover, when the error happens at the stage of the printing process and thereby the image is not printed by the printing device, the image made form the image device received from the printing apparatus is displayed as the error information. By seeing this image, a user can understand that the error happens in the printing process in the printing apparatus.

Furthermore, in the printing system, the error detecting device detects the error in a process of generating the image data by the image data generating device. Thus, the error at the stage of the process of generating the image data can be detected, and the image data can be sent to the host apparatus when the error happens in the middle of the process of generating the image data. Thereby, the image can be display by the host apparatus when the error happens in the middle of the process generating the image data. Accordingly, a user can easily understand that the error happens in the middle of the process of generating the image data.

Furthermore, in the printing system, the error detecting device detects the error in a process of printing the image by the printing device. Thus, the error at the stage of the process of printing the image can be detected, and the image data can be sent to the host apparatus when the error happens in the middle of the process of printing the image. Thereby, the image can be display by the host apparatus when the error happens in the middle of the process printing the image. Accordingly, a user can easily understand that the error happens in the middle of the process of printing the image.

Furthermore, in the printing system, the error information sending device sends the generated image data and an error message to the host apparatus. Thus, a user can more easily understand the state of the error.

Moreover, in the printing system, the error information displaying device has: an receiving information displaying device for displaying information indicating that the image data is received by the error information receiving device; an input device for inputting an instruction to display the image on the basis of the received image data from an external; and an image displaying device for displaying the image on the basis of the received image data when the instruction is inputted by the input device.

When the error happens in the middle of working, the image based on the image data received form the printing apparatus is displayed in the middle of working. As a result, there is the case that the user's work is disturbed by the displayed image. In this case, since the image supplied from the printing apparatus as the error information is alternatively displayed according to a user's selection, it is possible to prevent the error information from disturbing user's work.

According to the present invention, the aforementioned object can be also achieved by a method of displaying error information in a printing system comprising a host apparatus for generating print data and sending the generated print data to a printing apparatus, and the printing apparatus for printing an image on the basis of the received print data, the method having the processes of:

generating the print data in the host apparatus; sending the generated print data from the host apparatus to the printing apparatus; receiving the print data from the host apparatus, in the printing apparatus; storing the received print data in the printing apparatus; generating image data on the basis of the stored print data in the printing apparatus; printing an image on the basis of the generated image data in the printing apparatus; detecting an error in the processes from the process of receiving the print data to the process of printing the image, in the printing apparatus; sending the generated image data at a stage when the error is detected in the process of detecting the error, from the printing apparatus to the host apparatus; receiving the image data from the printing apparatus, in the host apparatus; and displaying an image on the basis of the received image data, as the error information, in the host apparatus.

Thus, a user can recognize the state of the error by seeing the displayed image, so that the user can easily and quickly know the cause of the error and try to find the best measures to cope with the error. Furthermore, as the error information is displayed by the host apparatus, a user can quickly see the image and know the state of the error. Namely a user need not to move between the place of the host apparatus and the place of the printing apparatus even if the printing apparatus is put at the place far from the host apparatus. Moreover, when the error happens at the stage of the printing process and thereby the image is not printed by the printing device, the image supplied from the printing apparatus is displayed as the error information. By seeing this image, a user can understand that the error happens in the printing process in the printing apparatus.

According to the present invention, the aforementioned object can be also achieved by a program storage device readable by a host apparatus and a printing apparatus in a printing system comprising the host apparatus for generating print data and sending the generated print data to the printing apparatus, and the printing apparatus for printing an image on the basis of the received print data, tangibly embodying a program of instructions executable by the host apparatus and the printing apparatus to perform method processes for displaying error information in the printing system, said method processes comprising: generating the print data in the host apparatus; sending the generated print data from the host apparatus to the printing apparatus; receiving the print data from the host apparatus, in the printing apparatus; storing the received print data in the printing apparatus; generating image data on the basis of the stored print data in the printing apparatus; printing an image on the basis of the generated image data in the printing apparatus; detecting an error in the processes from the process of receiving the print data to the process of printing the image, in the printing apparatus; sending the generated image data at a stage when the error is detected in the process of detecting the error, from the printing apparatus to the host apparatus; receiving the image data from the printing apparatus, in the host apparatus; and displaying an image on the basis of the received image data., as the error information, in the host apparatus.

Thus, a user can recognize the state of the error by seeing the displayed image, so that the user can easily and quickly know the cause of the error and try to find the best measures to cope with the error. Furthermore, as the error information is displayed by the host apparatus, a user can quickly see the image and know the state of the error. Namely a user need not to move between the place of the host apparatus and the place of the printing apparatus even if the printing apparatus is put at the place far from the host apparatus. Moreover, when the error happens at the stage of the printing process and thereby the image is not printed by the printing device, the image supplied from the printing apparatus is displayed as the error information. By seeing this image, a user can understand that the error happens in the printing process in the printing apparatus.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to FIGS. 1 to 5, embodiments of the present invention will be now explained.

Figure 1:
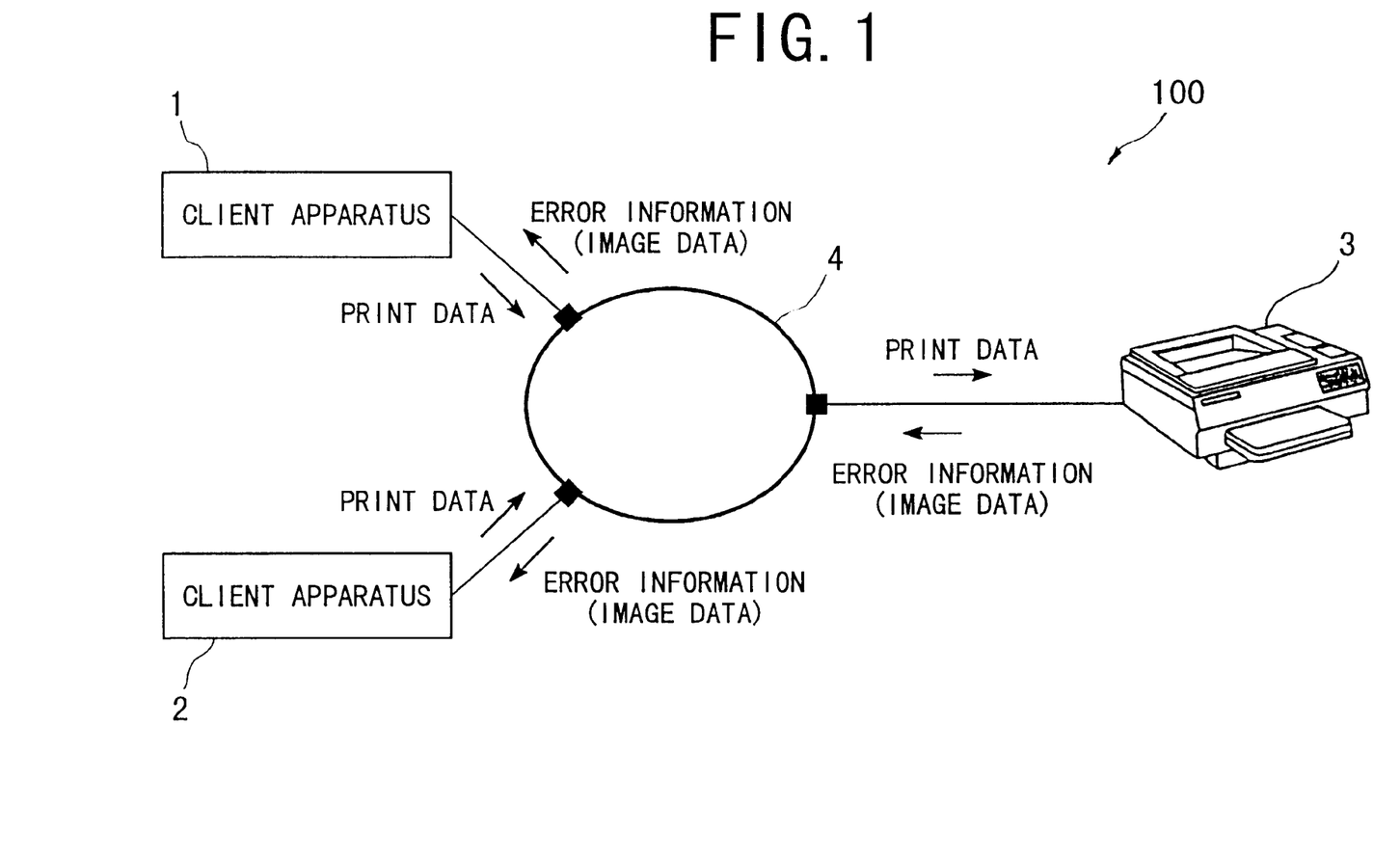
FIG. 1 is a block diagram showing a configuration of a printing system of an embodiment of the present invention.

As show in FIG. 1, a printing system 100 of an embodiment of the present invention has: a plurality of client apparatuses 1 and 2 for generating print data; a network printer 3 adaptable for a network; and a network 4 for connecting the client apparatuses 1 and 2 with the network printer 3 respectively. Each of the client apparatuses 1 and 2 is a personal computer or the like. The print data outputted from each client apparatus 1, 2 is sent to the printer 3 through the network 4, and it is managed by the printer 3 as an unit called a print job.

In addition, in case of a system in which one printer is shared with a plurality of computers, a host apparatus is called a client apparatus.

Figure 2A:
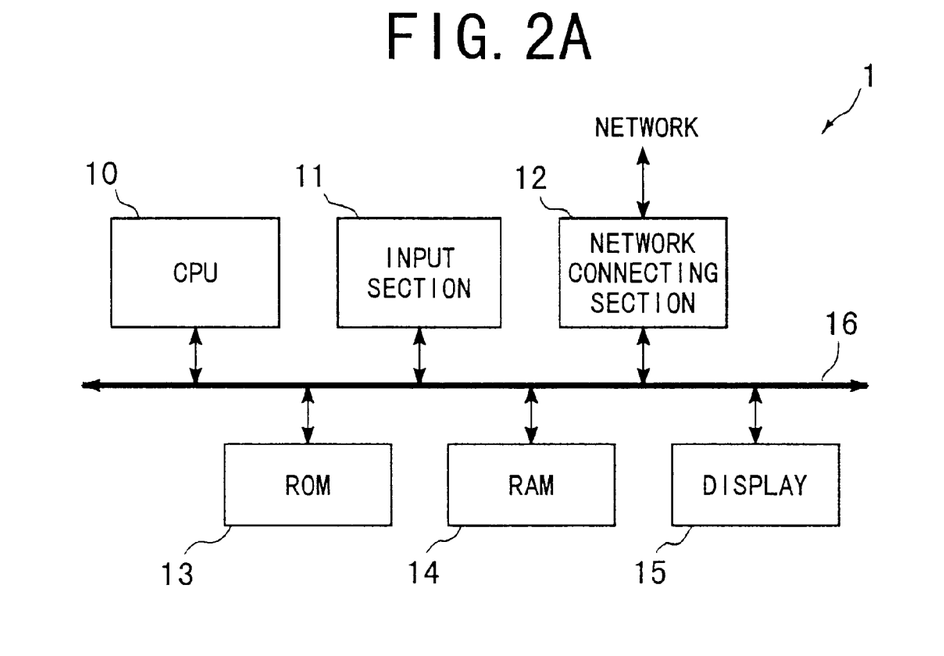
FIG. 2A is a block diagram showing a configuration of a client apparatus of the embodiment of the present invention.

FIG. 2A shows the configuration of the client apparatus 1. As the configuration of the client apparatus 2 is the same as that of the client apparatus 1, an explanation thereof is omitted.

As shown in FIG. 2A, the client apparatus 1 has: a CPU 10; an input section 11 for inputting data necessary for processes in the client apparatus 1; a network connecting section 12; a ROM 13; a RAM 14; a display 15; and a bus 16 for connecting these devices and sections with each other.

The network connecting section 12 performs the conversion of a protocol for data outputted by the client apparatus 1 and the data inputted to the client apparatus 1 and the like to thereby enable the client apparatus 1 to send and receive the data through the network 4.

The input section 11 composed of a keyboard, a mouse and the like outputs data inputted by an operation of a user of the client apparatus 1 through the bus 16 to the CPU 10 and the like.

The ROM 13 is a read only memory for storing a control program necessary for the process in the CPU 10, and then reads out the necessary program at a predetermined timing to output to the bus 16.

The RAM 14 is actually composed of a memory, such as a hard disk and the like, and a print control program and an error information managing program to realize functions described later are installed therein. Moreover, the RAM 14 temporarily stores data necessary for processes in the CPU 10 and the like, and outputs them to the bus 16 as necessary.

The display 15 performs the display necessary for the process in the CPU 10, and also displays the image based on image data described later.

The CPU 10 performs an operating process to realize the functions described later, based on the programs stored in the RAM 14 or controls the above mentioned respective components to thereby causes the client apparatus 1 to function as each device described later.

Figure 2B:
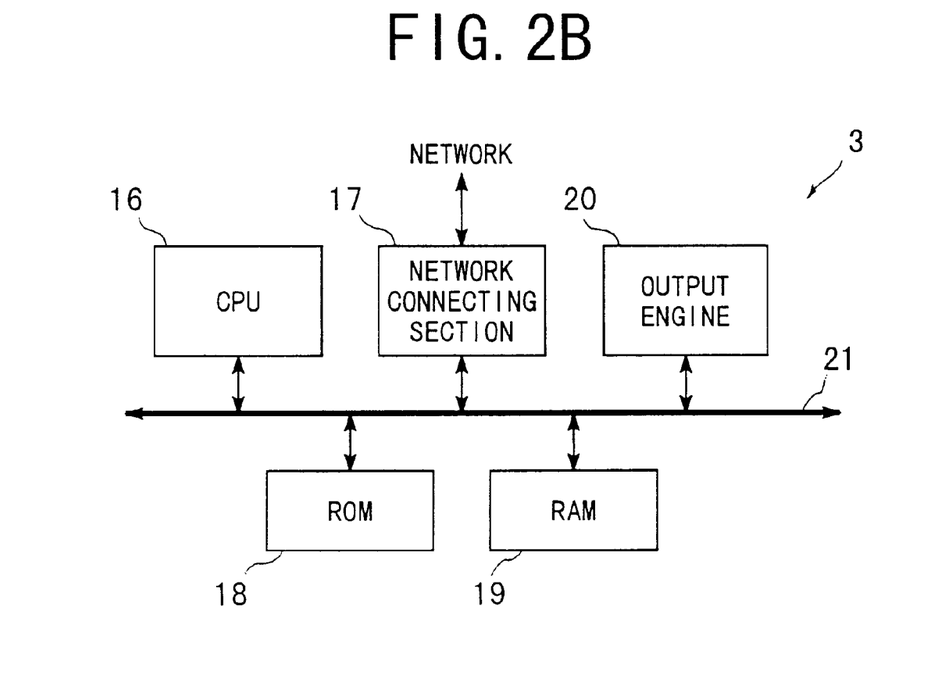
FIG. 2B is a block diagram showing a configuration of a printing apparatus of the embodiment of the present invention.

Next, the configuration of the printer 3 is explained with reference to FIG.2B. As shown in FIG. 2B, the printer 3 has: a CPU 16; a network connecting section 17; a ROM 18; a RAM 19; an output engine 20; and a bus 21.

The network connecting section 17 performs the conversion of a protocol for the data outputted by the printer 3 and the data inputted to the printer 3 and the like to thereby enable data communication between the client apparatus 1, 2 and the printer 3 through the network 4.

The ROM 18 is a memory for storing a print control program to realize functions described later, and then reads out the necessary program at a predetermined timing to output to the bus 21.

The RAM 19 temporarily stores the data necessary for the process in the CPU 16 and the like, and outputs to the bus 21 as necessary.

The output engine 20 is composed of an ink jet type or a laser beam type of a printing section, and performs a printing process by the control of the CPU 16.

The CPU 16 performs an operating process to realize the functions described later, based on the control program stored in the ROM 18, or controls the above mentioned respective devices to thereby cause the network printer 3 to function as each device described later.

As mentioned above, both the client apparatuses 1, 2 and the printer 3 have the CPUs, and are constructed so as to function as the device for implementing the print managing system in this embodiment, based on the installed or pre-stored program.

Figure 3A:
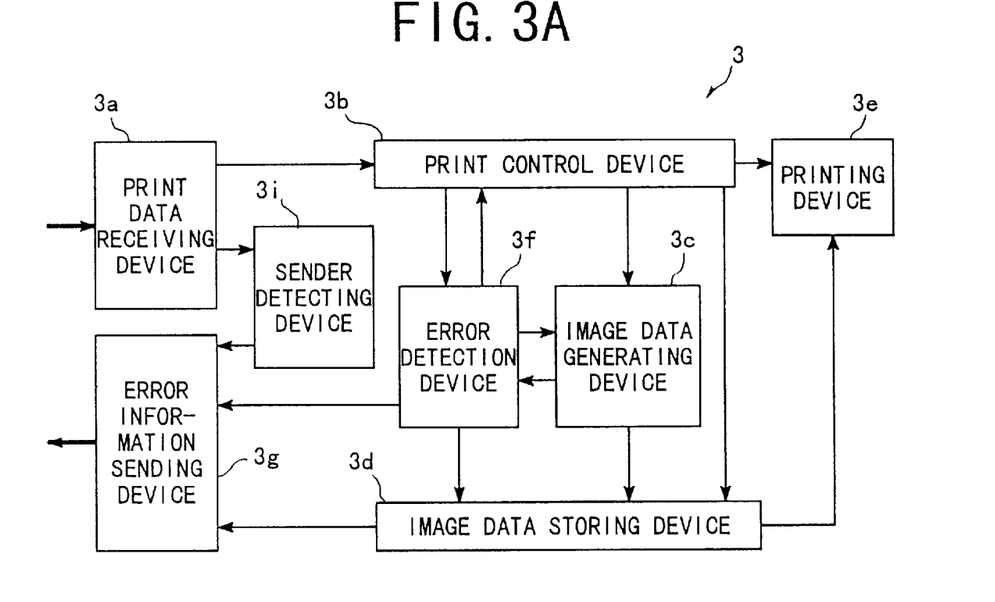
FIG. 3A is a block diagram showing functions of the printing apparatus of the embodiment of the present invention.
Figure 3B:
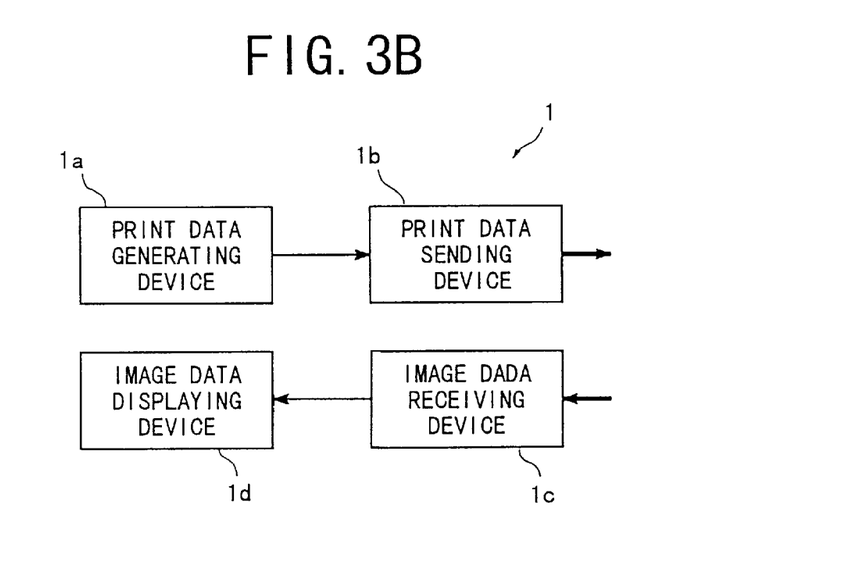
FIG. 3B is a block diagram showing functions of the client apparatus of the embodiment of the present invention.

FIGs. 3A and 3B are block diagrams to explain the client apparatus 1 and the printer 3 in view of the function. Incidentally, also in FIG. 3, the configuration of the client apparatus 2 is the same as that of the client apparatus 1. Thus, the explanation is omitted.

As shown in FIG. 3A, the printer 3 functions as a print data receiving device 3a, a print control device 3b, an image data generating device 3c, an image data storing device 3d, a printing device 3e, an error detecting device 3f, an error information sending device 3g and a sender detecting device 3i. Namely, these devices are realized in the CPU 16 by the execution of the control program stored in the ROM 18 and by cooperation between the CPU 16 and other components of the network printer 3, i.e., the network connecting section 17, the ROM 18, the RAM 19, the output engine 20 and the bus 21.

The print data receiving device 3a is a device for receiving the print data described by using the page description language sent from the client apparatuses 1 and 2, and outputting the received print data to the print control device 3b.

The print control device 3b is a device for storing the received print data into a storage device installed in the printing apparatus 3, and managing the stored print data for each print job. Further, the print control device 3b performs an overall control of the printer 3. The print data is outputted to the image data generating device 3c under the control of the print control device 3b.

The image data generating device 3c is a device for analyzing the print data outputted from the print control device 3b, and generating the image data such as bitmap data and the like. Namely, the image data generating device 3c converts and expands the page description language into the bitmap data. Here, in the embodiment, a page memory method is used as a method of generating the image data. In the page memory method, after image data corresponding to the whole of one page of printing paper is stored in a memory, the stored print data is printed.

The image data storing device 3d is a device for storing the image data generated by the image data generating device 3c, and outputting the stored image data to the printing device 3e according to an instruction from the print control device 3b.

The printing device 3e is a device for printing according to an electrophotography system used for a laser beam printer, an inkjet system or the like. Namely, the printing device 3e prints an image on a printing material on the basis of the image data.

The error detecting device 3f is a device for detecting an error in the processes from receiving the print data to printing the image data, and outputting the detected error to the error information sending device 3g.

The error information sending device 3g is a device for sending error information to the client apparatuses 1 and 2. In the embodiment, the error information sending device 3g reads the image data from the image data storing device 3d at the stage when detecting the error, and sends the read image data as the error information.

The sender detecting device 3i a device for detecting and determining whether a sender of the print data corresponding to the print job is the client apparatus 1 or 2 for each print job. The sender detecting device 3i sends information of the sender of the print job to the error information sending device 3g when the error information sending device 3g sends the error information.

Next, as shown in FIG. 3B, the client apparatus 1 functions as a print data generating device 1a, a print data sending device 1b, an image data receiving device 1c and an image data displaying device 1d. Namely, these devices are realized in the CPU 10 by the execution of the installed programs by cooperation between the CPU 10 and other components of the client apparatus 1, i.e., the input section 11, the network connecting section 12, the ROM 13, the RAM 14, the display 15 and the bus 16.

The print data generating device 1a a device for generating the print data by using the page description language, and outputting the generated print data to the print data sending device 1b.

The print data sending device 1b a device for sending the print data to the printer 3 through the network 4.

The image data receiving device 1c a device for receiving the image data sent from the printer 3 through the network 4 as the error information, and outputting the received image data to the image data displaying device 1d.

The image data displaying device 1d a device for displaying the image based on the image data sent from the printer 3 as the error information when the error is detected.

Figure 4:
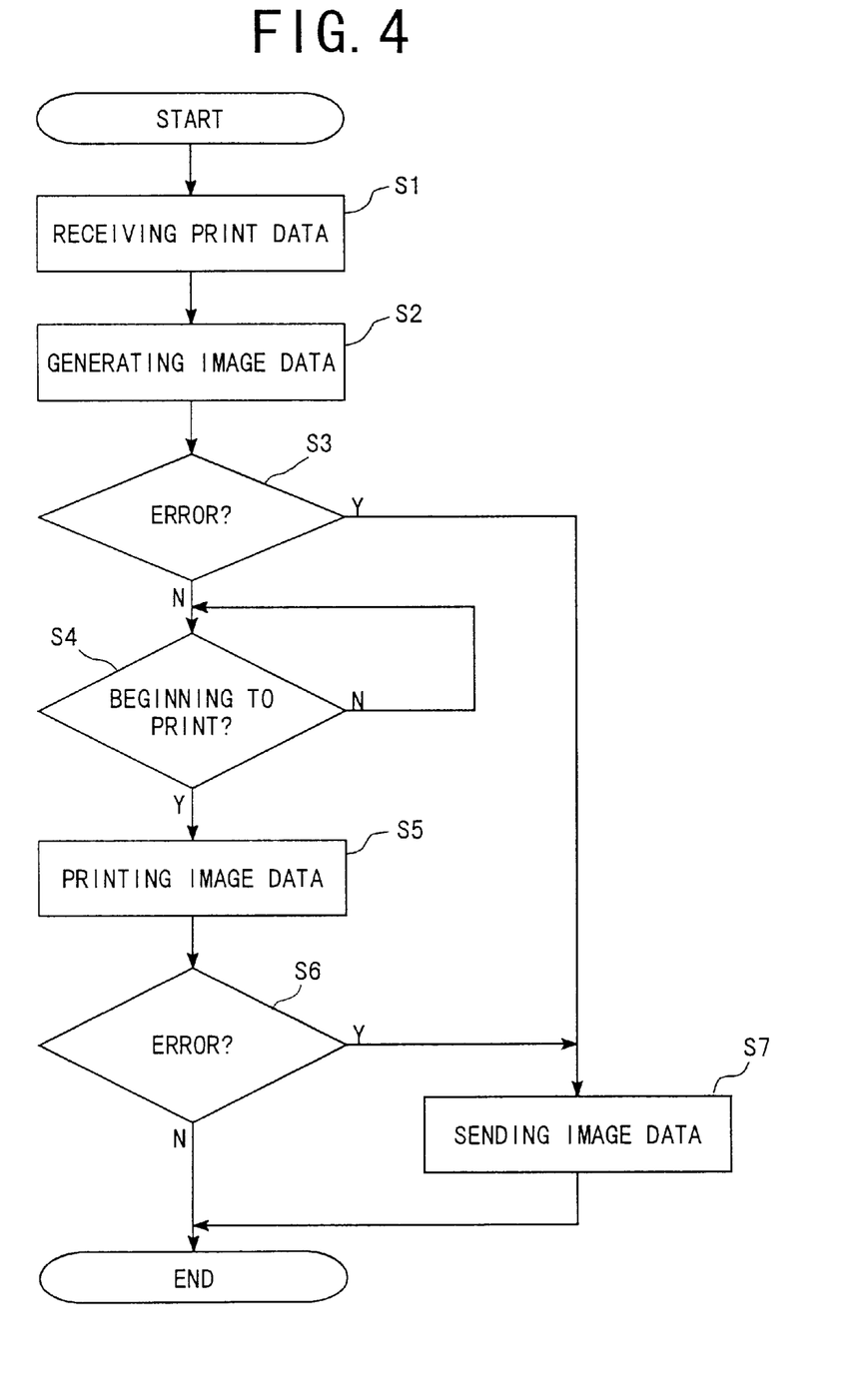
FIG. 4 is a flowchart showing a process of displaying error information at the side of the client apparatus when an error happens in the printing apparatus in the embodiment of the present invention.

Next, the printing process including the management of the error information is explained with reference to the flowchart shown in FIG. 4.

At first, the print data generated by the print data generating device 1a of the client apparatus 1 or 2 by using the page description language is sent from the print data sending device 1b to the printer 3 through the network 4, and received by the print data receiving device 3a of the printer 3 (Step 1). Next, the received print data is temporarily stored into the storage device by the print control device 3b, and outputted to the image data generating device 3c under the control of the print control device 3b. Then, the print data is expanded into the bitmap data, i.e., the image data is generated by the image data generating device 3c, and the image data is stored into the image data storing device 3d (Step 2).

Here, to expand into the bitmap data is carried out by execution of the emulation program. Namely, the CPU 16 which functions as the image data generation device 3c executes the emulation program in order to analyze the page description language and expand the print data into the bitmap data. Therefore, if there is an error or a bug in the emulation program itself, or if there is an error or mistake in the print data described by using the page description language, the error is detected by the error detection device 3f at the stage of the expanding process.

On the other hand, if the print data is complex or a quantity of the print data is too large, the storage of the memory space is detected as the error by the error detection device 3f at the stage of the expanding process.

When such an error happens, if a user can understand the state of the error at the stage when the error happens, the user can change the print data so as to not hit a bug included in the emulation program, reconsider generation of the print data, or reduce the quantity of the print data, in order to cope with the error.

In the embodiment of the present invention, not only information of occurrence of the error but also the image data at the stage when the error happens is sent to the client apparatuses 1 and 2, and the image based on the image data is displayed by the client apparatuses 1 and 2.

More concretely, the error detection device 3f detects and determines whether or not the error happens at the stage of the expanding process (Step 3), if the error is detected (Step 3; YES), the error information sending device 3g sends the image data stored in the image data storing device 3d to either of the client apparatuses 1 and 2 immediately after the error detection. Thereby, the image data at the stage of the expanding process is sent to either of the client apparatuses 1 and 2. Here, when sending the image data, the error information sending device needs to decide whether the image data is sent to either the client apparatus 1 or the client apparatus 2. Therefore, the sender detecting device 3i supplies information to decide whether the image data is sent to either the client apparatus 1 or the client apparatus 2. Namely, the sender detection device 3i detects a sender when the print data receiving device 3a receives the print data, correlates with the information of the sender with the print job corresponding to the received print data, and memorize the correlation between the information of the sender and the print job. When the error information sending device 3g sends the image data, the sender detecting device 3i supplies the information of the sender correlating with the print job which is executed at this time to the error information sending device 3g.

On the other hand, in a case that there is no error while the image data is generated in the expanding process (Step 3;

NO), it is determined whether or not a condition of the printing device 3e is ready and the printing device 3e can begin to print (Step 4). If the printing device 3e can begin to print (Step 4 ; YES), the printing device 3e prints the image on the basis of the image data stored in the image data storing device 3d. (Step 5).

Here, while the printing device 3e performs the printing operation, there is a case that an error, such as jamming paper, lacking toner, lacking ink or the like, happens. When such an error happens, the error is detected by the error detecting device 3i (Step 6).

If the error is not detected (Step 6; NO), the process is ended. On the other hand, if the error is detected (Step 6; YES), the image data at the stage of the printing process is sent to either of the client apparatuses 1 and 2 (Step 7).

Figure 5A:
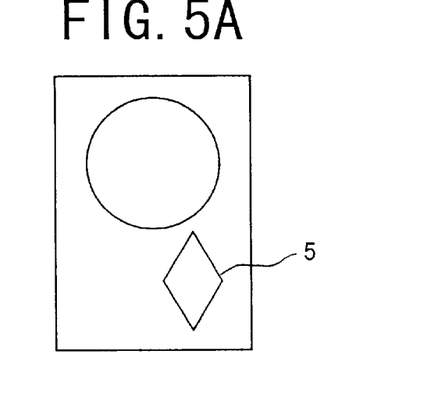
FIG. 5A is a diagram showing a normal image.
Figure 5B:
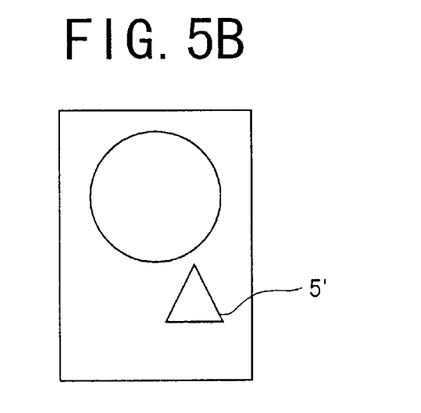
FIG. 5B is a diagram showing an image when an error happens.
Figure 5C:
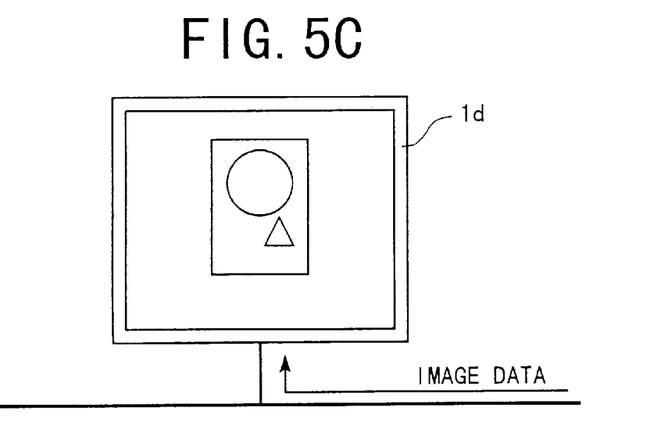
FIG. 5C is a diagram showing a display of the client apparatus displaying an image when an error happens according to the embodiment of the present invention.

As shown in FIG. 5C, the image based on the image data is displayed as error information by the image data displaying device 1d of the client apparatus 1 or 2, i.e., the display 15.

FIG. 5A shows a normal image which is produced when the error does not happen. FIG. 5B shows an image which is produced when the error happens. In FIG. 5C, the image shown in FIG. 5B is displayed. In FIG. 5A, a picture 5 is shaped like a rhombus. In FIG. 5B, a picture 5' is shaped like a triangle. The picture 5' is just an upper part of the picture 5. Thus, the picture 5' shown in FIG. 5B means that the expanding process has been stopped in the middle thereof.

When seeing the displayed incomplete image, a user can understand that the expanding process has been stopped in the middle thereof, i.e., the error happens while the image data is generated.

Further, the user can understand that a cause of the error is the shortage of the memory space by seeing the displayed incomplete image. Namely, the causes of the error at the stage of the expanding process are a bug of the emulation program, mistake of the print data and the shortage of the memory space. If the cause of the error is a bug of the emulation program or mistake of the print data, an image is not produced at all or a completely different image is produced. If the cause of the error is the shortage of the memory space, an image is partially produced as shown in FIG. 5C. Thus, the user can understand that the cause of the error is the shortage of the memory space by seeing the image as shown in FIG. 5C.

As mentioned above, according to the printing system 100 of the embodiment of the present invention, a user can recognize the state of the error on the basis of the displayed image made form the image data at the stage when the error happens. Accordingly, the user can easily and quickly know the cause of the error and try to find the best measures to cope with the error.

Furthermore, according to the printing system 100, as the error information, i.e. the image based on the image data is displayed by the client apparatuses 1 and 2, a user can quickly see the image and know the state of the error. A user need not to move between the place of the client apparatus 1, 2 and the place of the printer 3 even if the printer 3 is put at the place far from the client apparatus 1, 2.

Moreover, according to the print system 100, when the error happens at the stage of the printing process and thereby the image is not printed, a complete image is displayed as the error information. Namely, when the complete image is displayed as the error information, this means that there is no error in the expanding process but there is the error in the printing process. At this time, a user can understand that the error happens in the printing operation. This effect is very useful for a case that images of the plural pages are printed. Because a user can know a page where the error happens and quickly know a page to resume printing.

Here, in the print system 100, a page memory method is used for the expanding process. However, the present invention can be adapted for the another print system wherein a band method is used for the expanding process. In the band method, print data corresponding to one page of printing paper is divided into the plural blocks, and the print data is expanded to bitmap data by using a memory corresponding to the one or a few blocks for each one or a few blocks. In the case that the band method is used, it is preferable to display not only the image data but also a message to represent the type of the error as error information. Because, in the case that the band method is used, if there is no error in the expanding process, the image may be partially displayed by the client apparatus 1, 2 as the error information, when the error happens in the printing process. As a result, a user cannot understand whether the error happens in the expanding process or the printing process.

In addition, in the case that the band method is used, when the image data is generated as the error information, the print data is sequentially expanded and sent by repeatedly using the memory.

Moreover, in the case of the print system 100 wherein the page memory method is used for the expanding process, the image based on the image data and the error message may be displayed by the client apparatuses 1 and 2. By seeing the error message, a user can more easily and more quickly know the cause of the error and try to find the best measures to cope with the error.

Moreover, in the aforementioned embodiment, the image based on the image data is always displayed as the error information when the error happens. The present invention is not limited to this. The image based on the image data may be alternatively displayed according to a user's selection.

Namely, when each of the client apparatuses 1 and 2 receives the error information, each of the client apparatuses 1 and 2 may display only occurrence of the error. Thereafter, if a user inputs an instruction to display the image based on the image data by using the input section 11, i.e., the keyboard or the mouse, each of the client apparatuses 1 and 2 may display the image on the basis of the image data.

Thus, it is possible to prevent the error information from disturbing user's work. Namely, when the error happens in the middle of working, the image based on the image data received form the printer 3 is displayed by the client apparatus 1, 2 in the middle of working. As a result, there is the case that the user's work is disturbed by the displayed image. In order to solve this problem, the image based on the image data is alternatively displayed according to a user's selection.

In addition, in the aforementioned embodiment, the present invention is adapted to the printing system wherein each client apparatus is connected with the network printer through a network. The present invention is not limited to this configuration. For example, the present invention can be adapted to the printing system wherein one host apparatus, such as a personal computer, is connected with one printer.

Moreover, in the aforementioned embodiment, the present invention is adapted to the printing system wherein the page description language is expanded into the bitmap data. The present invention is not limited to this. The present invention can be adapted to the printing system using a run-length data, for example, the printing system wherein the print data is converted into the run-length data, and then, the run-length data is converted into the bitmap data.

Furthermore, the print control program and the error information managing program which realize the printing system of the present invention as mentioned above can be recorded on a recording medium or a program storage device, such as a CD-ROM, a floppy disk or the like, which can be read by each of the client apparatus and the printer. Accordingly, the printing system of the present invention is realized by using the CD-ROM or the like to then install and execute the print control program and the error information managing program in each of the client apparatus and the printer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A printing system comprising a host apparatus for generating print data and sending the generated print data to a printing apparatus, and the printing apparatus for printing an image on the basis of the received print data, the host apparatus comprising:
a print data generating device for generating the print data;
a print data sending device for sending the generated print data to the printing apparatus;
an error information receiving device for receiving image data from the printing apparatus; and
an error information displaying device for displaying an image showing an image represented by the received image data as error information, the printing apparatus comprising:
a print data receiving device for receiving the print data from the host apparatus;
a print data storing device for storing the received print data;
an image generating device for generating the image data on the basis of the stored print data;
a printing device for printing an image on the basis of the generated image data;
an error detecting device for detecting an error in processes from receiving the print data by the print data receiving device to printing the image by the printing device; and
an error information sending device for sending the generated image data at a stage where the error is detected by the error detecting device to the host apparatus.

2. A printing system according to claim 1, wherein the error detecting device detects the error in a process of generating the image data by the image data generating device.

3. A printing system according to claim 1, wherein the error detecting device detects the error in a process of printing the image by the printing device.

4. A printing system according to claim 1, wherein the error information sending device sends the generated image data and an error message to the host apparatus.

5. A printing system according to claim 1, wherein
the error information displaying device comprises:
a receiving information displaying device for displaying information indicating that the image data is received by the error information receiving device;
an input device for inputting an instruction to display the image showing the image represented by the received image data from an external; and
an image displaying device for displaying the image on the basis of the received image data when the instruction is inputted by the input device.

6. A printing system according to claim 1, wherein the error information displaying device displays an image represented by the received image data.

7. A printing system according to claim 1, wherein the error information displaying device displays a same image as or a similar image to be printed out by the printing device of the printing apparatus, on the basis of the received image data.

8. A method of displaying error information in a printing system comprising a host apparatus for generating print data and sending the generated print data to a printing apparatus, and the printing apparatus for printing an image on the basis of the received print data, the method comprising the processes of:

generating the print data in the host apparatus;
sending the generated print data from the host apparatus to the printing apparatus;
receiving the print data from the host apparatus, in the printing apparatus;
storing the received print data in the printing apparatus;
generating image data on the basis of the stored print data in the printing apparatus;
printing an image on the basis of the generated image data in the printing apparatus;
detecting an error in the processes from the process of receiving the print data to the process of printing the image, in the printing apparatus;
sending the generated image data at a stage when the error is detected in the process of detecting the error, from the printing apparatus to the host apparatus;
receiving the image data from the printing apparatus, in the host apparatus; and
displaying an image showing an image represented by the received image data, as the error information, in the host apparatus.

9. A method according to claim 8, wherein, in the process of detecting the error, the error is detected in the process of generating the image data.

10. A method according to claim 8, wherein, in the process of detecting the error, the error is detected in the process of printing the image.

11. A method according to claim 8, wherein, in the process of sending the generated image data, an error message is further sent to the host apparatus.

12. A method according to claim 8, wherein the process of displaying the image comprises the processes of:
displaying information indicating that the image data is received in the process of receiving the image data;
receiving an instruction to display the image showing the image represented by the received image data from an external; and
displaying the image showing the image represented by the receiving image data when the instruction is received in the process of receiving the instruction.

13. A method according to claim 8, wherein the displaying process comprises the process of displaying an image represented by the received image data.

14. A method according to claim 8, wherein the displaying process comprises the process of displaying a same image as or a similar image to an image to be printed out by the printing device of the printing apparatus, on the basis of the received image data.

15. A program storage device readable by a host apparatus and a printing apparatus in a printing system comprising the host apparatus for generating print data and sending the generated print data to the printing apparatus, and the printing apparatus for printing an image on the basis of the received print data, tangibly embodying a program of instructions executable by the host apparatus and the printing apparatus to perform method processes for displaying error information in the printing system, said method processes comprising:

generating the print data in the host apparatus;

sending the generated print data from the host apparatus to the printing apparatus;

receiving the print data from the host apparatus, in the printing apparatus;

storing the received print data in the printing apparatus;

generating image data on the basis of the stored print data in the printing apparatus;

printing an image on the basis of the generated image data in the printing apparatus;

detecting an error in the processes from the process of receiving the print data to the process of printing the image, in the printing apparatus;

sending the generated image data at a stage when the error is detected in the process of detecting the error, from the printing apparatus to the host apparatus;

receiving the image data from the printing apparatus, in the host apparatus; and displaying an image showing an image represented by the received image data, as the error information, in the host apparatus.

16. A program storage device according to claim 15, wherein, in the process of detecting the error, the error is detected in the process of generating the image data.

17. A program storage device according to claim 15, wherein, in the process of detecting the error, the error is detected in the process of printing the image.

18. A program storage device according to claim 15, wherein, in the process of sending the generated image data, an error message is further sent to the host apparatus.

19. A program storage device according to claim 15, wherein the process of displaying the image comprises the processes of:

displaying information indicating that the image data is received in the process of receiving the image data;

receiving an instruction to display the image showing the image represented by the received image data from an external; and displaying the image showing the image represented by the receiving image data when the instruction is received in the process of receiving the instruction.

20. A program storage device according to claim 15, wherein the displaying process comprises the process of displaying an image represented by the received image data.

21. A program storage device according to claim 15, wherein the displaying process comprises the process of displaying a same image as or a similar image to an image to be printed out by the printing device of the printing apparatus, on the basis of the received image data.

* * * * *